(12) United States Patent
Matsumoto

(10) Patent No.: US 9,110,459 B2
(45) Date of Patent: Aug. 18, 2015

(54) INTERFERENCE CHECK DEVICE, INTERFERENCE CHECK METHOD, AND MACHINE TOOL HAVING THE INTERFERENCE CHECK DEVICE

(75) Inventor: Hitoshi Matsumoto, Kitasaku-gun (JP)

(73) Assignee: CITIZEN MACHINERY CO., LTD., Kitasaku-Gun, Nagano (JP)

( * ) Notice: Subject to any disclaimer, the term of this patent is extended or adjusted under 35 U.S.C. 154(b) by 352 days.

(21) Appl. No.: 12/737,358

(22) PCT Filed: Jul. 6, 2009

(86) PCT No.: PCT/JP2009/062302
§ 371 (c)(1),
(2), (4) Date: Jan. 4, 2011

(87) PCT Pub. No.: WO2010/004960
PCT Pub. Date: Jan. 14, 2010

(65) Prior Publication Data
US 2011/0106291 A1    May 5, 2011

(30) Foreign Application Priority Data
Jul. 10, 2008 (JP) .................................. 2008-179912

(51) Int. Cl.
*G05B 19/4061* (2006.01)
*B23Q 39/02* (2006.01)

(52) U.S. Cl.
CPC .......... *G05B 19/4061* (2013.01); *B23Q 39/027* (2013.01); *G05B 2219/35306* (2013.01); *G05B 2219/35316* (2013.01); *G05B 2219/35317* (2013.01); *G05B 2219/39082* (2013.01)

(58) Field of Classification Search
CPC .......................... G05B 19/4061; B23Q 39/027

USPC .......................................................... 700/178
See application file for complete search history.

(56) References Cited

U.S. PATENT DOCUMENTS 4,558,419 A * 12/1985 Kanematsu et al. .......... 700/169
5,127,140 A * 7/1992 Oiwa et al. .................... 29/27 C
(Continued)

FOREIGN PATENT DOCUMENTS

| JP | H08-263116 | 10/1996 |
| JP | 09-230918 | 9/1997 |
| JP | 2006-255794 | 9/2006 |

OTHER PUBLICATIONS

European Patent Office, "Extended European Search Report for EP 09 79 4404", May 28, 2013.

*Primary Examiner* — Darrin Dunn
(74) *Attorney, Agent, or Firm* — Manabu Kanesaka

(57) ABSTRACT

An interference check device is disposed in an apparatus including a plurality of moving bodies, moving devices for moving the plurality of moving bodies, and another moving device for moving at least one of the moving bodies in a same axial line direction as one of the moving devices. The interference check device conducts interference check when at least one of the moving bodies is moved, and includes an absolute movement amount calculating part which synthesizes a movement amount of at least one of the plurality of moving bodies, which is a subject to be checked, in the same axial line direction based on data inputted to one of the moving devices and another moving device, to determine an absolute movement amount in the same axial line direction, and an interference check part associating with the absolute amount calculating part for checking the interference check from the absolute movement amount.

3 Claims, 4 Drawing Sheets

(56) References Cited

U.S. PATENT DOCUMENTS

| | | | |
|---|---|---|---|
| 5,751,584 A * | 5/1998 | Yuasa et al. | 700/178 |
| 6,651,279 B1 | 11/2003 | Muthuvelan | |
| 7,594,457 B2 * | 9/2009 | Shibui et al. | 82/1.11 |
| 2007/0186735 A1 * | 8/2007 | Shibui et al. | 82/1.11 |

* cited by examiner

INTERFERENCE CHECK DEVICE, INTERFERENCE CHECK METHOD, AND MACHINE TOOL HAVING THE INTERFERENCE CHECK DEVICE

RELATED APPLICATIONS

The present application is National Phase of International Application No. PCT/JP2009/062302 filed Jul. 6, 2009, and claims priority from Japanese Application No. 2008-179912 filed Jul. 10, 2008, the disclosure of which is hereby incorporated by reference herein in its entirety.

TECHNICAL FIELD

The present invention relates to an interference check device which checks the interference of a movable body, a method for checking interference and a machine tool having an interference check device.

BACKGROUND ART

As shown in FIG. 4 of Patent Document 1, an automatic lathe has conventionally been known in which, on a movable front tool rest which is movable in the X1-axial direction which orthogonally crosses the axial line of a first main spindle, a tool rest (cutting-off tool rest) is provided which is movable in the X2-axial direction which is in parallel with a second main spindle and the above-mentioned X1-axial direction. The cutting-off tool rest of this automatic lathe moves in a direction which orthogonally crosses the axial line of the main spindle by two moving means, i.e. the X1 axis and the X2 axis.

On the other hand, in a machine tool provided with a plurality of tool rests, an interference check device which checks interference of tool rests and interference of a tool rest and a stationary structure or the like (see Patent Document 2, for example) is known.

RELATED ARTS

Patent Documents

Patent Document 1: JP-A-2006-255794
Patent Document 2: Japanese Patent No. 3464307

SUMMARY OF THE INVENTION

Problems to be Solved by the Invention

In the above-mentioned interference check device, it is required to input a moving axis corresponding at least to the moving direction of a movable body. However, only one moving axis can be set for one moving direction of one movable body. Therefore, as shown in Patent Document 1, there was a drawback that, if a plurality of moving means are provided for two moving directions, a plurality of relative moving axes corresponding to one moving direction of one movable body are present, whereby interference check cannot be conducted easily.

Means for Solving the Problem

In order to solve the above-mentioned problems, the interference check device of the present invention has a configuration in which it is disposed in an apparatus provided with one or a plurality of moving bodies which are capable of moving in a predetermined direction and moving means for moving said one or a plurality of moving bodies, and has a plurality of moving means for moving at least one of the moving bodies in the same axial line direction, and conducts interference check when said movable body is moved, which comprises:

an absolute movement amount calculating part which synthesizes the movement amount of said movable body in the same direction by the plurality of moving means, thereby to determine the absolute movement amount in said direction; and an interference check part which is provided in association with this absolute amount calculating part and conducts the interference check from the absolute movement amount.

The absolute movement amount calculating part may be configured such that a plurality of moving axes are synthesized in the same axial line direction by said plurality of moving means, a virtual axis is provided in the same axial direction as the moving axis, and the absolute movement amount is obtained based on this virtual axis.

Further, a judging part may be provided which judges whether a plurality of moving axes for moving the same movable body in the same axial direction are present among the inputted moving axes.

The method for checking interference of the present invention is a method in which an interference check is conducted in a device which is disposed in an apparatus which is provided with one or a plurality of moving bodies which are capable of moving in a predetermined direction and moving means for moving said one or a plurality of moving bodies, and has a plurality of moving means for moving at least one of said moving bodies, and conducts interference check when said movable body is moved, which comprises the steps of:

designating a movable body which has a possibility to be interfered and inputting the moving axis of this movable body;

judging if a plurality of moving axes for moving the same movable body in the same axial line direction are present among the inputted moving axes, and if judgment is made that such a plurality of moving axes are present, synthesizing the movement amount in the same axial line direction as that of said plurality of moving axes, thereby to obtain an absolute movement amount in said moving direction; and conducting an interference check from said absolute movement amount.

In addition, if a plurality of moving axes are judged to be present in the same direction for the same movable body, one virtual axis is provided in the same direction as that of said plurality of moving axes, and the absolute movement amount is obtained based on this virtual axis.

The machine tool according to the present invention is characterized in that it is provided with the above-mentioned interference check device.

Advantageous Effects of the Invention

According to the above-mentioned configuration of the present invention, due to the presence of the absolute movement calculating part, even in the case where a plurality of moving means are provided for one moving direction of one movable body, interference check of the movable body can be conducted easily based on an absolute movement amount which is calculated by synthesizing the amount of relative movement of the movable body.

BEST MODE FOR CARRYING OUT THE INVENTION

Figure 1:
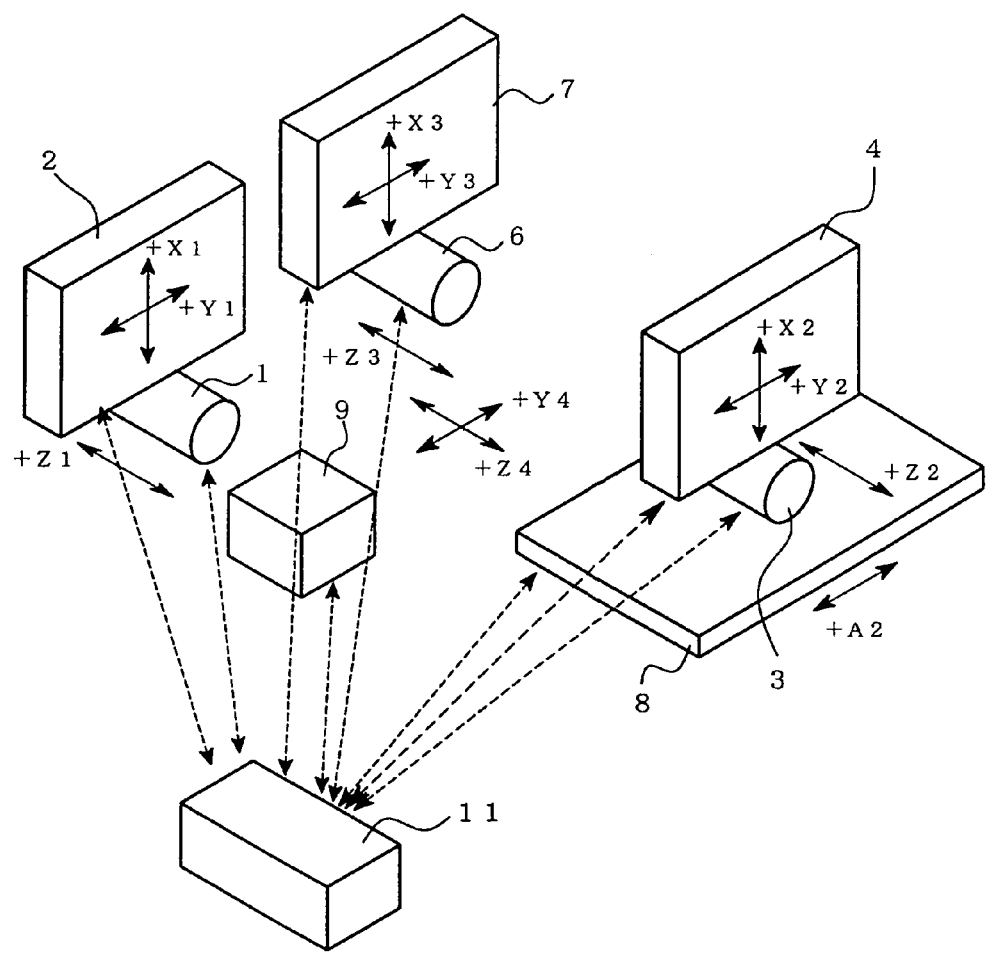
FIG. 1 is a schematic view of a machine tool on which the interference check device of the present invention is provided.

FIG. 1 shows a schematic view of the machine tool on which the interference check device of the present invention is provided. The machine tool is provided with a first main spindle 1 and a first tool rest 2 provided in correspondence with the first main spindle 1, a second main spindle 3 and a second tool rest 4 provided in correspondence with the second main spindle 3, a third main spindle 6 and a third tool rest 7 provided in correspondence with the third main spindle 6, and a fourth tool rest 9 provided such that it selectively corresponds to each of the main spindles 1, 3 and 6. The first main spindle 1, the first tool rest 2, the second main spindle 3, the second tool rest 4, the third main spindle 6, the third tool rest 7 and the fourth tool rest 9 are provided on a bed of the machine tool, which is not shown.

The first main spindle 1 is movable in the Z1-axial direction which is the same as that of the axial line direction. The first main spindle 1 is moved in the Z1-axial direction by means of a motor for the Z1 axis, a feed screw mechanism or the like which constitute the moving means for the first main spindle 1.

The first tool rest 2 is provided on an XY table which orthogonally crosses the Z1 axis and can be moved in the X1-axial direction and the Y1-axial direction which orthogonally cross with each other. The first tool rest 2 can be moved in the X1-axial direction and the Y1-axial direction together with this XY table. The XY table moves in the X1-axial direction by a motor for the X1 axis, a feed screw mechanism or the like constituting the means for moving the first tool rest 2 in the X1-axial direction, and moves in the Y1-axial direction by a motor for the Y1 axis, a feed screw mechanism or the like constituting the means for moving the first tool rest in the Y1-axial direction.

The third main spindle 6 is arranged such that it is adjacent to the first main spindle 1 so that the axial line of the third main spindle 6 is in parallel with and in the same direction of the axial line of the first main spindle 1. Further, it can be moved in the Z3-axial direction which is the same direction as that of the axial line direction. The third main spindle 6 moves in the Z3-axial direction on a bed by a motor for the Z3 axis, a feed screw mechanism or the like which constitute the means for moving in the Z3-axial direction.

The third tool rest 7 is provided on the XY table which orthogonally crosses the Z3 axis and can be moved in the X3- and Y3-axial directions which orthogonally cross with each other. This XY table moves in the X3-axial direction by a motor for the X3 axis, a feed screw mechanism or the like which constitute the means for moving the third tool rest 7 in the X3-axial direction, and moves in the Y3-axial direction by a motor for the Y3 axis, a feed screw mechanism or the like which constitute the means for moving the third tool rest 7 in the Y3-axial direction. The X1-axial direction and the X3-axial direction are set in the same direction, and the Y1-axial direction and the Y3-axial direction are set in the same direction.

On the bed, a moving table 8 is provided which can be moved in the A2-axial direction which is the same direction as that of the axial line of the Y1 axis and that of the Y3 axis. This moving table 8 moves in the A2-axial direction on the bed by means of a motor for the A2 axis, a feed screw mechanism or the like which constitute a means for moving the moving table 8 in the A2-axial direction.

The second main spindle 3 and the second tool rest 4 are provided on the moving table 8, and can be moved in the A2-axial direction integrally with the moving table 8. The second main spindle 3 is arranged such that the axial line thereof is in the same direction of and in parallel with the axial line of the first main spindle 1 and the axial line of the third main spindle 6, and such that it is opposed to the first main spindle 1 and the third main spindle 6. Further, the second main spindle 3 can be moved in the Z2-axial direction which is the same axial direction as that of the axial line direction. The second main spindle 3 moves in the Z2-axial direction on the moving table 8 by a motor for the Z2 axis, a feed screw mechanism or the like which constitutes the means for moving the second main spindle 3 in the Z2-axial direction.

The second tool rest 4 is provided on the XY table which orthogonally crosses the Z2 axis and can be moved in the X2-axial direction and the Y2-axial direction which orthogonally cross with each other. This XY table is provided on the moving table 8, and moves in the X2-axial direction on the moving table 8 by a motor for the X2 axis, a feed screw mechanism or the like constituting the means for moving the second tool rest 4 in the X2-axial direction, and then moves in the Y2-axial direction on the moving table 8 by a motor for the Y2 axis, a feed screw mechanism or the like constituting the means for moving the second tool rest 4 in the Y2-axial direction. The axial line direction of the X2 axis, the axial line direction of the X1 axis and the axial line direction of the X3 axis are set in the same direction, and the axial direction of the Y2 axis, the axial direction of the Y1 axis, the axial direction of the Y3 axis and the axial direction of the A2 axis are set in the same direction.

The fourth tool rest 9 is provided on an YZ table which is provided on a bed and can be moved in the Y4-axial direction and the Z4-axial direction which orthogonally cross each other. This YZ table moves in the Y4-axial direction by a motor for the Y4 axis, a feed screw mechanism or the like which constitutes the means for moving the fourth tool rest 9 in the Y4 direction, and moves in the Z4-axial direction through a motor for the Z4 axis, a feed screw mechanism or the like which constitute the means for moving the fourth tool rest 9 in the Z4 direction. The Y4-axial direction is set in the same direction as that of the Y1-axial direction, the Y2-axial direction, the Y3-axial direction and the A2-axial direction, and the Z4-axial direction, is set in the same direction as that of the Z1-axial direction, and the Z2-axial direction and the Z3-axial direction.

In FIG. 1, the signal "+" indicates the direction of the movement of each movable body. For example, in the first tool rest 2, the second tool rest 4 and the fourth tool rest 7, the direction in which a tool becomes more distant from a workpiece piece is indicated as "+" and, although not shown, the direction in which a tool becomes more close to a workpiece is indicated as "−".

As mentioned above, the X1-axial direction, the X2-axial direction and the X3-axial direction are the same axial line directions, the Y1-axial direction, the Y2-axial direction, the A2-axial direction, the Y3-axial direction and the Y4-axial direction are the same axial line directions, and the Z1-axial direction, the Z2-axial direction, the Z3-axial direction and the Z4-axial direction are the same axial directions. In the following, the moving directions on the X1 axis, the X2 axis and the X3 axis may often be referred to as the X direction, the moving directions on the Y1 axis, the Y2 axis, the A2 axis, the Y3 axis and the Y4 axis may be referred to as the Y direction, the moving directions on the Z1 axis, the Z2 axis, the Z3 axis and the Z4 axis may be referred to as the Z direction.

In this machine tool, a control device 11 which controls the driving of each of the above-mentioned motors is provided. In this embodiment, the control device 11 is composed of an NC device. In this machine tool, by driving control according to the NC program which has been read by the control device 11 (NC device), a workpiece held on the first main spindle 1 can be machined by means of a tool mounted on the first tool rest 2 by the combination of the movement in the Z direction of the first main spindle 1 and the movements in the X and Y directions of the first tool rest 2. A workpiece held on the second main spindle 3 can be machined by means of a tool mounted on the second tool rest 4 by the combination of the movement in the Z direction of the second main spindle 3 and the movement in the X and Y directions of the second tool rest 4. A workpiece held on the third main spindle 6 can be machined by means of a tool mounted on the third tool rest 7 by the combination of the movement in the Z direction of the third main spindle 6 and the movements in the X and Y directions of the third tool rest 7.

Further, the fourth tool rest 9 is allowed to move in the Y direction and the Z direction, thereby to cause it to position such that it corresponds to any of the first main spindle 1 to the third main spindle 6. As a result, a workpiece held on any of the first main spindle 1 to the third main spindle 6 can be machined by a tool mounted on the fourth tool rest 9 by the combination of the movement of the main spindle in the Z direction and the movement of the fourth tool rest 9 in the Y direction and the Y direction.

Further, the second tool rest 4 can be moved in the Y direction by means of two moving means, that is, the moving means in the Y2-axial direction and the moving means in the A2-axial direction. Therefore, machining of a workpiece held on the second main spindle 3 by means of a tool mounted on the second tool rest 4 can be conducted on the moving table 8 by causing the second main spindle 3 and the second tool rest 4 to integrally move in the Y direction by the moving table 8. For example, by the movement of the moving table 8 in the A2-axial direction, the second main spindle 3 is moved from a position at which the axial line of the first main spindle 1 and the axial line of the second main spindle 3 coincide a position at which the axial line of the third main spindle 6 and the axial line of the second main spindle 3 coincide, whereby machining of a workpiece held on the second main spindle 3 can be conducted by a tool mounted on the second tool rest 4.

Figure 2:
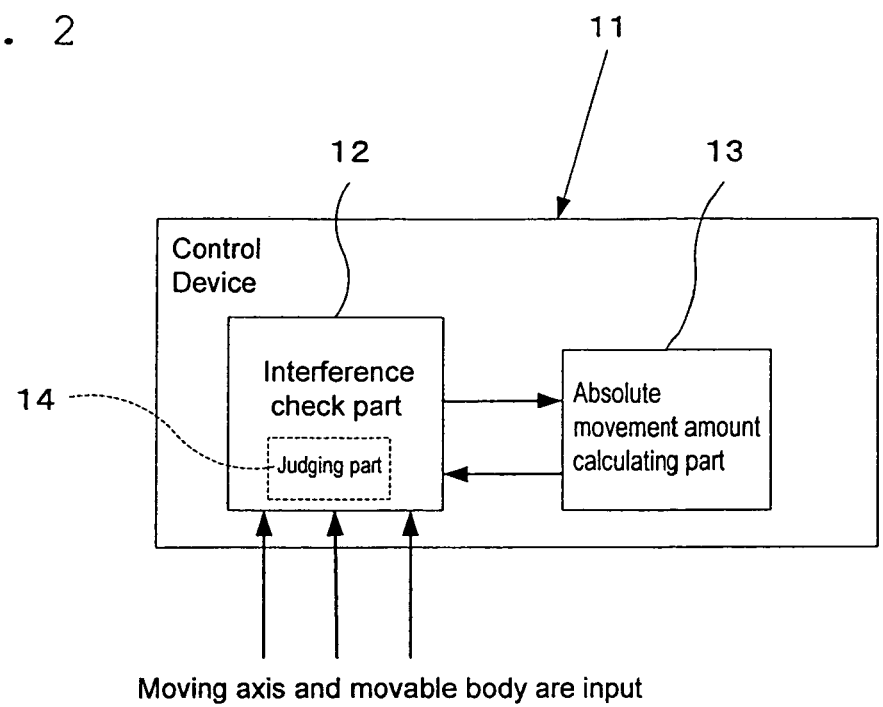
FIG. 2 is a schematic block diagram of essential parts of the control device.

As shown in FIG. 2, the control device 11 is provided with an interference check part 12 which checks interference which occurs when the first main spindle 1 to the third main spindle 6 and the first tool rest 2 to the fourth tool rest 7, which constitute the moving bodies in this machine tool, move. By inputting information of each of the above-mentioned moving bodies in the interference check part 12, interference of one movable body with other moving bodies, interference of a movable body with a stationary structure such as a machine tool is checked, whereby occurrence of interference can be detected.

Interference check by the interference check part 12 can be conducted by a known method. However, in the interference check part 12, it is required to input and set a movable body to be checked for interference and a moving axis corresponding at least to the movement in the X-, Y- and Z-directions of the movable body.

For example, when interference of the first tool rest 2 with the fourth tool rest 9 is checked, the first tool rest 2 and the fourth tool rest 9 are inputted as moving bodies to be checked for interference. For the first tool rest 2, the X1 axis is inputted as the moving axis in the X direction and the Y1 axis is inputted as the moving axis in the Y direction, and for the fourth tool rest, the Y4 axis is inputted as the moving axis in the Y direction and the Z4 axis is inputted as the moving axis in the Z direction.

In the interference check part 12 of the present invention, if a plurality (two or more) of moving means are provided in one moving direction of one movable body as in the case of the second tool rest 4, an absolute amount calculating part 13 is provided, which synthesizes each of the movement amounts in a plurality of moving axes which have been inputted for one moving direction of one movable body, and calculates an absolute movement amount of the movable body in the moving direction.

As shown in FIG. 2, the interference check part 12 may have a configuration that, if a judging part 14 is provided in the interference part 12 and this judging part 14 judges that a plurality of moving axes are present for one movable body from a plurality of moving axes which have been inputted, the absolute movement calculating amount part 13 synthesizes the movement amount for each of these movement axes. It is needless to say that the judging part 14 may be provided in the absolute movement calculating part 13, or may be provided separately from the interference check part 12 and the absolute amount calculating part 13.

In this embodiment, the interference check part 12, the absolute movement calculating part 13, or the combination of the interference check part and the absolute movement calculating part with the judging part 14 constitute the interference check device.

In this embodiment, in the interference check part 12, when the second tool rest 4 is inputted as the movable body to be checked for interference, as the moving axis in the Y direction of the second tool rest 4, the Y2 axis and the A2 axis can be inputted. In this embodiment, the absolute amount calculating part 13 synthesizes the movement amount on the Y2 axis of the second tool rest 4 relative to the moving table 8 by the moving means in the Y2 direction of the second tool rest 4 and the movement amount on the A2 axis of the moving table 8 relative to the bed by the moving means in the A2 direction, thereby to form a virtual moving axis (Y-direction virtual axis) of the second tool rest 4 relative to the bed, and the absolute movement amount (that is, a position on coordinates of the second tool rest 4 in the Y-direction virtual axis is obtained. Meanwhile, the absolute movement amount can be obtained in advance with a predetermined reference position of a machine tool, for example, the center of the end reference surface or the first main spindle 1, being as the reference.

When the movement amount of the second tool rest 4 on the virtual axis in the Y-direction obtained by the absolute amount calculating part 13 is inputted in the interference check part 12, interference of the second tool rest 4 with other moving bodies or with stationary structures or the like can be checked.

Figure 3:
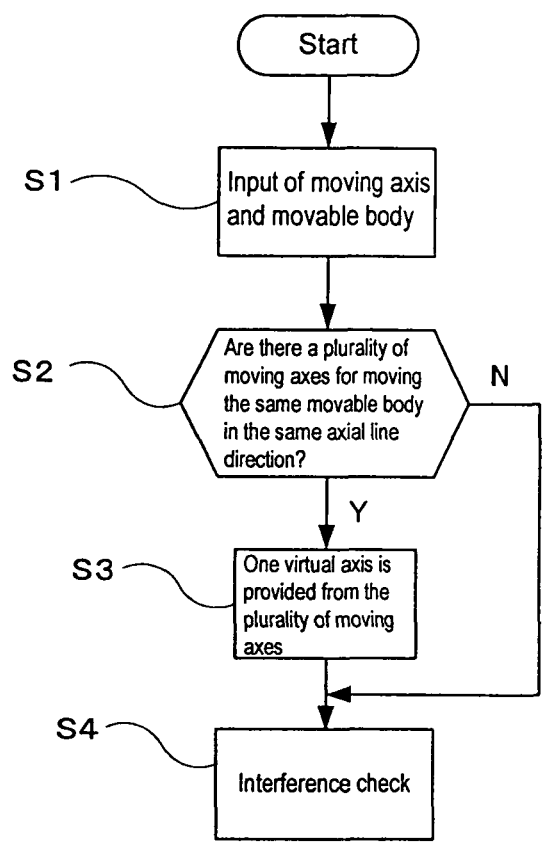
FIG. 3 is a flow chart for explaining one example of the action of the absolute amount calculating part 13 and the interference check part 12.

One example of the absolute movement amount calculating part 13 and the interference check part 12 will be explained with reference to FIG. 3.

In the step S1, a movable body to be checked for interference and the moving axis thereof are inputted in the interference check part 12. In this embodiment, since the second main spindle 3, the second tool rest 4 and the fourth tool rest 9 may interfere with each other, the moving axis of each of the second main spindle 3, the second tool rest 4 and the fourth tool rest 9 is inputted in the interference check part 12. At this time, the A2 axis is inputted as the Y-direction moving axis of the second main spindle 3, and the Y2 axis and the A2 axis are inputted as the Y-direction moving axis of the second tool rest 4. Further, since the first main spindle 1, the first tool rest 2 and the fourth tool rest 9 may interfere with each other, the moving axis of each of the first main spindle 1, the first tool rest 2 and the fourth tool rest 9 is inputted in the interference check part 12. Similarly, since the third main spindle 6, the third tool rest 7 and the fourth tool rest 9 may interfere with each other, the moving axis of the third main spindle 6, the third tool rest 7 and the fourth tool rest 9 is inputted in the interference check part 12.

Next, as shown in the step S2, judgment is conducted whether there are a plurality of moving axes for moving the same movable body in the same axial line direction. In the case where the judgment part 14 is provided, the judgment part 14 may be configured such that it can automatically conduct the above-mentioned judgment based on the above-mentioned input results. In addition, an operator may judge and input to the interference check part 12 so that the plurality of moving axes are inputted in the absolute movement amount calculating part 13 without providing the above-mentioned judging part 14. In this embodiment, since the Y2 axis and the A2 axis which have been inputted as the moving axes of the second tool rest 4 are in the same axial line direction, judgment is made that the Y2 axis and the A2 axis are present as a plurality of moving axes for moving the second tool rest 4 in the same direction.

In the step S2, if it is judged that there are a plurality of moving axes for moving the same movable body in the same axial line direction, as shown in the step S3, the absolute movement calculating part 13 provides one virtual axis from the plurality of moving axes. In this embodiment, from the Y2 axis and the A2 axis which are the moving axes of the second tool rest 4, a virtual Y-direction moving axis, i.e. the Y2' axis (Y-direction virtual axis), obtained by synthesizing the Y2 axis and the A2 axis is provided. As a result, the two axes of the second tool rest 4, i.e., the A2 axis and the Y2 axis, are replaced by the Y2' axis, which is one Y-direction virtual axis, then the step S4 starts.

If judgment is made that a plurality of moving axes for moving the same movable body in the same axial direction are not present in the step S2, the subsequent step S4 starts without providing a virtual axis. Then, in the step S4, the interference check part 12 conducts interference check from the amount of movement in each moving axis and the above-mentioned absolute movement amount in the virtual axis.

Figure 4:
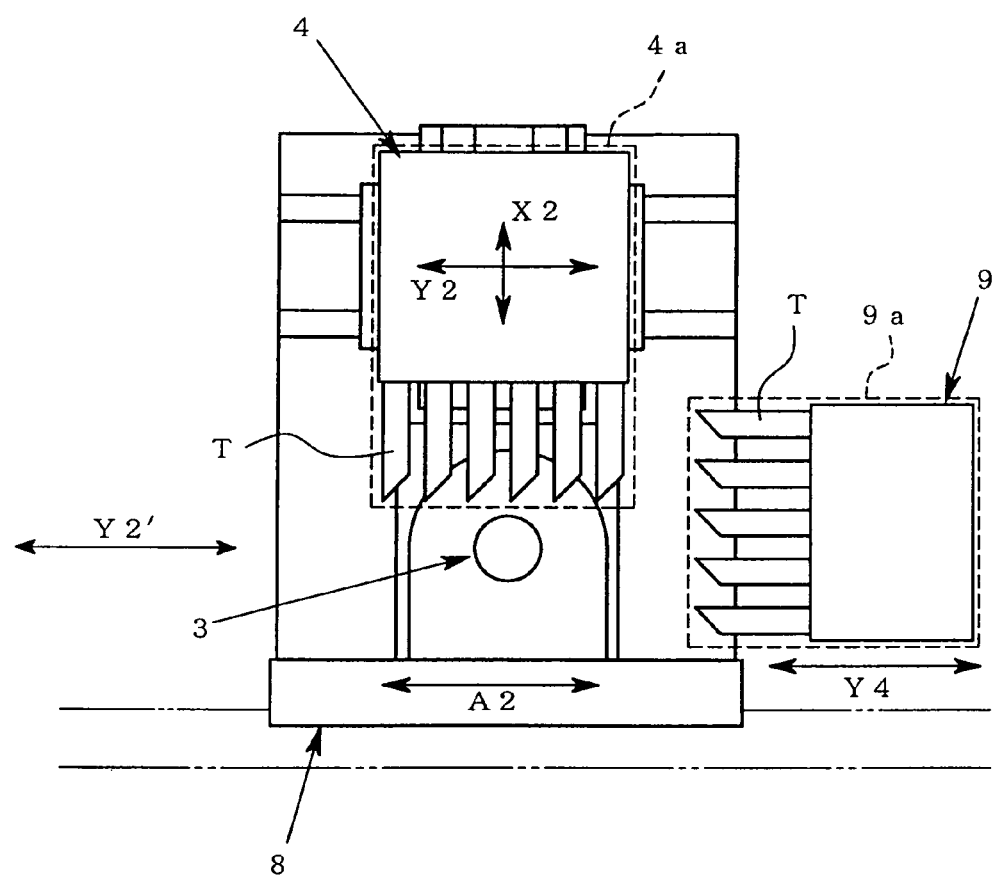
FIG. 4 is a view for explaining one example of interference check of the second tool rest, for which the virtual axis in the Y direction is set, and the fourth tool rest.

FIG. 4 shows one example of interference check of the second tool rest 4 in which the Y2' axis, which is the Y-direction virtual axis, is set and the fourth tool rest 9. An interference check region (the region 4a surrounded by a dotted line) including the second tool rest 4 and the tool T mounted thereon and an interference check region (the region 9a surrounded by a dotted line) including the fourth tool rest 9 and the tool T mounted thereon. From the current positions of the second tool rest 4 and the fourth tool rest 9, based on the movement instructions in the X2 direction, the Y2 direction and the A2 direction for the second tool rest 4, determination is made on the position to which the second tool rest 4 moves on the Y2' axis and the X2 axis.

Further, based on instructions of moving in the Z4 direction and the Y4 direction for the fourth tool rest 9, determination is made on the position to which the fourth tool rest 9 moves on the Z4 axis and the Y4 axis. On the position of the both axes thus calculated, if the interference check region 4a of the second tool rest 4 and the interference check region 9a of the fourth tool rest 9 cross, the interference check part 13 judges that interference occurs between the second tool rest 4 and the fourth tool rest 9, controls the movement of the second tool rest 4 and the fourth tool rest 9, and announces by means of an alarm or the like that interference occurs.

In this way, according to the present invention, by the association of the interference check part 12 and the absolute movement amount calculating part 13, interference check of the movable body can be easily conducted even when a plurality of moving means are provided in the same moving direction of one movable body.

Preferred embodiments of the present invention are explained hereinabove. However, the present invention is not restricted to the above-mentioned embodiments.

For example, the interference check part 12 and the absolute movement calculating part 13 may be provided on the same control device 11, or may be provided separately from the control device 11. The interference check part 12 and the absolute amount calculating part 13 may be separate bodies or may be an integrated body. Further, it may be configured such that the absolute movement calculating part 13 starts if a plurality of moving axes which are in the same direction for one movable body are inputted in the interference check part 12.

Further, as for the configuration of the input part of the moving axis, due to a configuration in which the moving direction to which the moving axis to be inputted corresponds can be arbitrarily set, a configuration in which a plurality of moving axes for one direction can be inputted in advance, a configuration in which one moving axis can be inputted relative to each of moving directions and, at the same time, a moving axis is inputted separately such that the moving direction thereof can be arbitrarily set, or the like, a plurality of moving axes can be inputted for one moving direction.

Further, in the above description, an explanation was made taking the moving axis in the Y direction of the second tool rest 4 as an example, on the assumption that the Y2 axis and the A2 axis are synthesized to form the Y2' axis which is a virtual axis in the Y direction. The movable body is not limited to a tool rest, and it may be a main spindle or other moving bodies. Further, the present invention can be applied to a case where a plurality of moving axes are present not only in the Y direction but also in the X direction or the Z direction. Further, the number of the moving axis to be synthesized is not limited to two, and the present invention can be applied to the synthesis of three or more moving axes. The absolute amount calculating part 13 may be respectively provided for each of the moving axes in the X-, Y- and Z-directions, or the common absolute amount calculating part 13 may be provided for each of the moving axes in the X-, Y- and Z-directions,

INDUSTRIAL APPLICABILITY

The present invention can be applied not only to a case where there are a plurality of moving bodies and check of interference of moving bodies and check of interference of a movable body and a stationary part is conducted, but also to a case where there is only one movable body and check of interference of this movable body with a stationary part is conducted. The interference check device and the interference check method of the present invention can be applied not only to machine tools but also to all devices which require interference check.

DESCRIPTION OF SYMBOLS

1. First main spindle (movable body)
2. First tool rest (movable body)

3. Second main spindle (movable body)
4. Second tool rest (movable body)
6. Third main spindle (movable body)
7. Third tool rest (movable body)
8. Moving table
9. Fourth tool rest (movable body)
11. Control device
12. Interference check part
13. Absolute movement amount calculating part
14. Judging part

The invention claimed is:

1. An interference check device disposed in an apparatus provided with a plurality of moving bodies, which is capable of moving in a predetermined direction, moving devices for moving said plurality of moving bodies, and another moving device for moving at least one of said moving bodies in a same axial line direction as one of the moving devices, said interference check device conducting interference check when said at least one of said moving bodies is moved, and comprising:
   an absolute movement amount calculating part which synthesizes a movement amount of said at least one of the plurality of moving bodies, which is a subject to be checked; in the same axial line direction based on data inputted for said at least one of the plurality of moving bodies and said plurality of moving bodies,
   when said at least one of the plurality of moving bodies is provided on a moving table, and is moved on the moving table by one of the moving devices and the moving table is moved in the same axial line direction as the moving body by said another moving device, thereby to determine an absolute movement amount in said same axial line direction; and
   an interference check part associating with the absolute movement amount calculating part, said interference checking part checking the interference check from said absolute movement amount,
   wherein said absolute movement amount calculating part synthesizes a plurality of moving axes in the same axial line direction by the plurality of moving devices, provides a virtual axis in the same axial line direction as a moving axis, and obtains said absolute movement amount based on the virtual axis.

2. A machine tool comprising the interference check device according to claim 1.

3. A method for checking interference for an apparatus which is provided with a plurality of moving bodies capable of moving in a predetermined direction, moving devices for moving said plurality of moving bodies, and another moving device for moving at least one of said moving bodies in a same axial line direction as one of the moving devices, said method conducting interference check when said moving body is moved, and comprising the steps of:
   designating one moving body among other moving bodies, which has a possibility to be interfered, and inputting a moving axis of said moving body as data;
   inputting moving axes of a plurality of moving axes of other moving bodies as data;
   judging whether among axial line directions of the plurality of moving axes for moving the other moving bodies, the axial line directions same as an axial line direction of the moving of the one moving body are present, and if judgment is made such that the plurality of moving axes is present, synthesizing movement amounts in the same axial line direction as that of said plurality of moving axes, thereby to obtain an absolute movement amount in said moving direction; and
   conducting an interference check from the absolute movement amount,
   wherein, when judgment is made such that the plurality of the moving devices for moving the moving body in the same axial line direction is present, one virtual axis is provided in the same axial line direction as that of the plurality of moving axes, and said absolute movement amount is provided based on the virtual axis.

* * * * *